(12) United States Patent
Brazill et al.

(10) Patent No.: US 11,769,103 B2
(45) Date of Patent: Sep. 26, 2023

(54) PRODUCT QUALITY DURING SHIPPING BY GENERATING LANE TEMPERATURE AND PRODUCT TEMPERATURE FROM MODELS

(71) Applicant: Modality Solutions LLC, League City, TX (US)

(72) Inventors: Brian Patrick Brazill, Avon, IN (US); Daniel Jay Littlefield, League City, TX (US)

(73) Assignee: Modality Solutions LLC, League City, TX (US)

( * ) Notice: Subject to any disclaimer, the term of this patent is extended or adjusted under 35 U.S.C. 154(b) by 689 days.

(21) Appl. No.: 16/786,136

(22) Filed: Feb. 10, 2020

(65) Prior Publication Data
US 2020/0258036 A1  Aug. 13, 2020

Related U.S. Application Data

(60) Provisional application No. 62/803,770, filed on Feb. 11, 2019.

(51) Int. Cl.
*G06Q 10/0832* (2023.01)
*G01W 1/10* (2006.01)
*G01K 1/02* (2021.01)

(52) U.S. Cl.
CPC .......... *G06Q 10/0832* (2013.01); *G01W 1/10* (2013.01); *G01K 1/02* (2013.01)

(58) Field of Classification Search
CPC ...... G06Q 10/0832; G01W 1/10; G01W 1/02; G01K 1/02; G01K 2207/04; G01K 7/427
See application file for complete search history.

(56) References Cited

U.S. PATENT DOCUMENTS

2020/0126031 A1\*  4/2020  Whalen ................ G06Q 30/018

\* cited by examiner

*Primary Examiner* — Toan M Le
(74) *Attorney, Agent, or Firm* — Meunier Carlin & Curfman LLC

(57) ABSTRACT

Systems and methods for modeling a temperature in a thermal package in a lane of commerce using forecast weather data or estimating the actual temperature history in a thermal package using actual weather data. Lane temperature is recognized and used as an intermediate calculated variable derived from weather data. Machine learning techniques estimate the lane temperature to determine a model. Product temperature in thermal packaging is estimated by simultaneously solving a set of heat transfer equations. The above is used to with forecast weather data to calculate a lane temperature and then calculate an expected product temperature based on the time and date of shipment. This product temperature curve is then analyzed with a set of decision rules to improve decision making on when to make a shipment and the best packaging to use.

17 Claims, 9 Drawing Sheets

PRODUCT QUALITY DURING SHIPPING BY GENERATING LANE TEMPERATURE AND PRODUCT TEMPERATURE FROM MODELS

CROSS-REFERENCE TO RELATED APPLICATION

This application claims priority to U.S. Provisional Patent Application No. 62/803,770, filed Feb. 11, 2019, entitled "Methods for Using Weather, Lane, and Package Data to Improve Logistics Decision Making for High Value Temperature Sensitive Product," the disclosure of which is incorporated herein by reference in its entirety.

BACKGROUND OF THE INVENTION

Shipping temperature sensitive products is an everyday occurrence, whether it is pharmaceuticals, foods, electronics, or many other products. When shipping these items, the industries rely on insulated packaging, heat sink materials, phase change materials, and/or active cooling and heating to protect the product. In addition, many of these shipments include temperature monitors to record the temperatures their products experience while shipping. These temperature monitors can then be used to confirm that the appropriate temperature was maintained in the packaging.

Companies can look at weather data to see what the weather is at an origin, destination, and everywhere in between for a shipment. However, the container is not directly exposed to these weather conditions when being shipped. The reason for this difference is that a container is often not just left outside, it is shipped on the inside of planes, trains, and trucks which have their own unique set of conditions in the cargo areas. As a result, there is a "lane temperature" that is experienced by a container, which is the temperature it actually experiences when shipped from an origin to a destination. The lane temperature is not completely independent of the weather temperature, but they are significantly different.

Many of the currently available solutions for shipping temperature sensitive product are overdesigned for their purpose, which increases shipping costs considerably. For example, an insulated package that is designed to maintain refrigerated temperature for twenty-four hours in the heat of summer is unneeded when it is used in early spring. When deciding what to use for shipping temperature sensitive products, a company selects a container that has been tested against the worst-case conditions for that time of year and route of travel. While this gives a high degree of confidence that the product maintains the correct temperature, it means the solutions are not experiencing anything close to the extreme conditions for which they are designed. A container may be qualified against the hottest summer day on record, but that container will be used on a relatively cool day on the last day of summer as well.

A specific industry example is the use of ISTA 7E for qualification of passive thermal packaging for the biopharma industry. The temperature profile for ISTA 7E is based on the 95% confidence interval of the hottest two weeks and coldest two weeks of the year in the United States for shipping lanes throughout the United States. The end result is a package designed to maintain temperature for 48 hours based on the ISTA 7E thermal profile is overdesigned for 48 weeks out of the year. To meet the strict criteria to work in the limited circumstances set by the ISTA 7E thermal profile, the packaging has more insulation and more phase change material than is needed for the majority of the year; yet the package is used as designed during times it is not needed. That extra insulation and phase change material results in higher packaging and shipping costs.

The standard for heat transfer modeling of thermal packaging is finite element analysis. These models use numerical methods to solve complex heat transfer processes through the use of steady state calculations over small time periods and short distances. To ensure good accuracy and stability of the simulation, the models will commonly use a 'grid' overlay for the package that contains more than one million points and calculate the resulting million plus steady state equations once per second. This is a significant calculation burden that hurts the ability to run numerous models quickly. In some cases it can take hours to run a single model. As a result, these calculations are typically only used when designing a container, as any other application requires a faster response from a model.

BRIEF SUMMARY OF THE DISCLOSURE

The present disclosure improves upon the current state of shipping of temperature sensitive products. First, lane temperature is recognized and used as an intermediate calculated variable derived from weather data. This eliminates the problem with conventional analysis of using the weather temperature as a poor proxy for the actual temperature(s) a package is exposed to in the lane of commerce. Second, machine learning techniques are used to customize the shipping lanes to estimate the lane temperature, which improves the results enough for the 'weather to lane model' to provide usable results. Third, the present disclosure presents an elegant solution for the complex heat transfer problem of estimating product temperature in thermal packaging. The solution uses a different approach to the heat transfer equations, by not using the grid method and instead using a pseudo geometry to simplify the calculations. This results in simulations that can be run in seconds instead of hours.

The sum of these key technology discoveries allows us to take forecast weather data for an origin and destination, calculate a lane temperature, and then calculate an expected product temperature based on the time and date of shipment. This product temperature curve is then analyzed with a set of decision rules to improve decision making on when to make a shipment (to avoid temperature extremes) and the best packaging to use (to take advantage of lighter, cheaper packaging in mild weather).

In accordance with the present disclosure, there is provided a method for modeling a temperature in a thermal package in a lane of commerce. The method includes receiving weather data; selecting a weather model in accordance with an origin of a shipment, a destination of the shipment, and a date and a time of the shipment; determining an estimated lane temperature for the shipment using a selected weather model, wherein the estimated lane temperature is an estimate of a temperature it actually experienced by the thermal package between the origin and the destination; determining a product temperature using a package model in accordance with the estimated lane temperature; determining a packaging to be used for the shipment from the product temperature; and displaying a determined packaging in a user interface.

In accordance with another aspect of the disclosure, there is provided a method modeling a thermal package's heat transfer. This further method includes using a pseudo-geometry that represents three heat transfer processes in a thermal package that include (1) product to phase change material (PCM), (2) ambient temperature to product, and (3) ambient temperature to PCM; for each of the three heat transfer processes: positing a solution of a partial differential equation as a first order plus dead time (FOPDT) model having a gain coefficient, a time constant, and a dead time that change as the PCM in the thermal package change phase; and simultaneously solving the three heat transfer models and adjusting the gain coefficient, the time constant, and the dead time constants for subcooled PCM, PCMs that are changing phase, and PCMs that have fully changed phase; and using a result to generate a package model that receives product temperature and lane temperature data to determine an optimal packaging from a predetermined set of packing to be used for a shipment of the product.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The foregoing summary, as well as the following detailed description of various and several implementations, is better understood when read in conjunction with the appended drawings. For the purpose of illustrating the disclosure, there is shown in the drawings example constructions of the implementations where like elements have like reference numerals; however, the disclosure is not limited to the specific methods and instrumentalities disclosed. In the drawings.

DETAILED DESCRIPTION

Overview

The present disclosure is directed to systems and methods for modeling the temperature in a thermal package in a lane of commerce using forecast weather data or estimating the actual temperature history in a thermal package using actual weather data.

Figure 1:
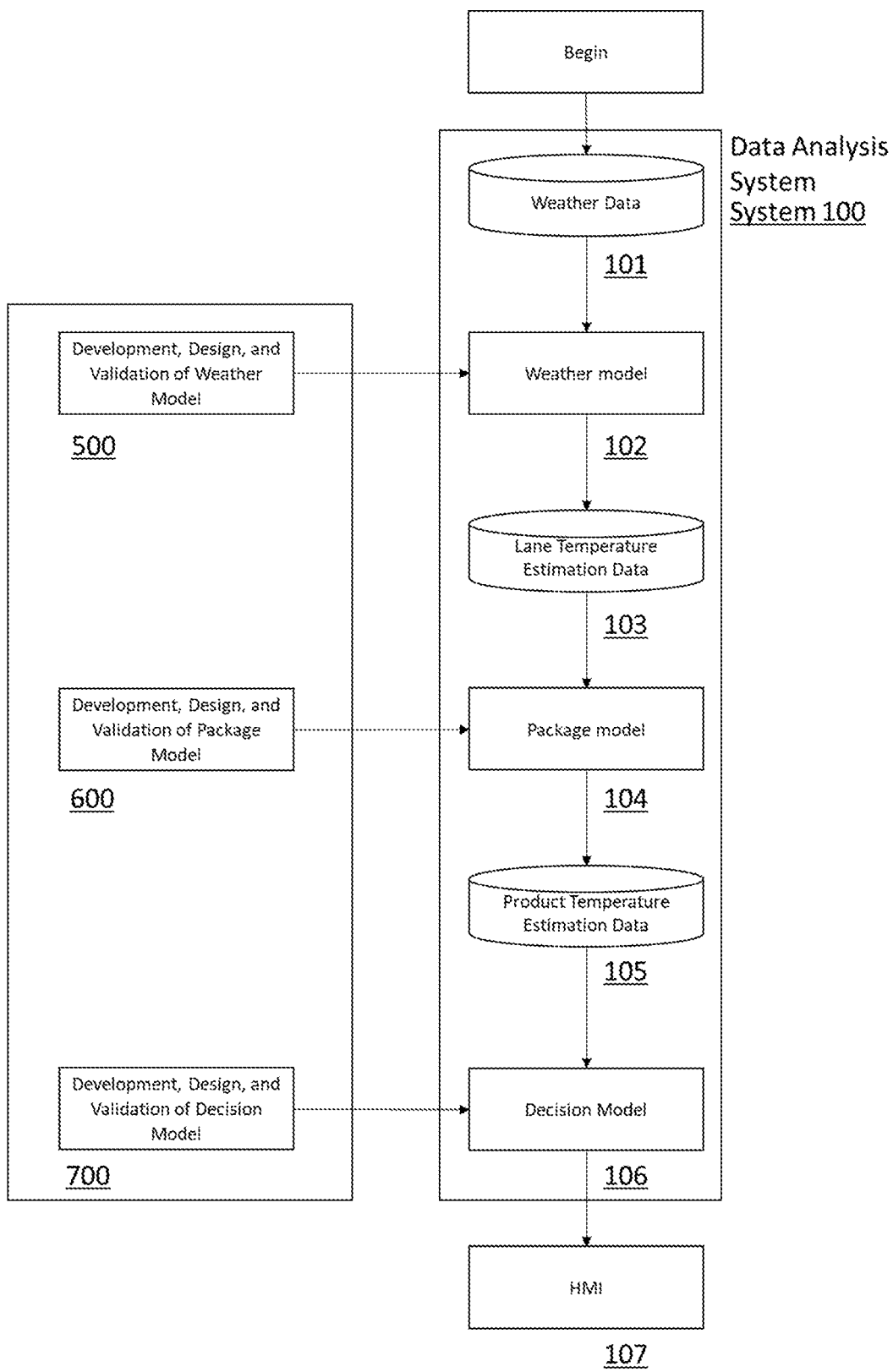
FIG. 1 is an overview of an environment in which the present disclosure may be implemented.

As shown in FIG. 1, there is illustrated a high-level overview and operation flow of a system 100 in which the present disclosure may be implemented. The system 100 may include one or more databases (101, 103, 105), as described below, where the weather data, lane temperature data, and the product temperature data are stored. A client, through a human machine interface (HMI), queries a server (system 100) to complete a set of scenarios. The server queries the databases for the relevant information, then inputs them into the model for calculation. The server then provides the results from the scenarios to the client.

The operational flow of FIG. 1 begins with weather data being downloaded through an API from a supplier of weather data and stored in weather data storage 101. The weather data may take any known format, including but not limited to excel (xlsx), comma separated values (csv), or text (txt) file formats.

A weather model 102 extracts data from the Weather Data Storage 101 based on origin, destination, date, and time of the shipment. The model then calculates the estimated lane temperature for that specific shipment by inputting the weather variables into a machine learning algorithm. Further details of the operations performed by the weather model 102 are described with reference to FIG. 2. The lane data is then stored in the Lane Data Storage 103. Lane Data Storage 103 may be a database which contains historical lane data and lane data estimates.

The package model 104 operates to extract data from the lane temperature storage 103 based on the shipment details. The package model 104 then calculates the estimated product temperature for that specific shipment using a first order plus dead time model. Further details of the operations performed by the package model 104 are described with reference to FIG. 3. The product temperature data is stored in the product temperature storage 105. Product temperature storage 105 may be a database which contains historical product temperature data and product temperature estimates.

Data from the product temperature storage 105 is then provided to a decision model 106 that applies rules to determine when to make a shipment and/or the best packaging to use for the shipment. Further details of the operations performed by the decision model 106 are described with reference to FIG. 7. The output of the decision model 106 is provided to the HMI 107 for display to an end user. For example, the HMI 107 is a client-facing computer which will provide the results from the data analysis system 100.

In the operational flow and system 100 of FIG. 1, the specific weather model to be used for a specific shipment in system 100 is selected based on origin, destination, date and time of shipment, and service level for the shipment. This specific model is developed using a weather model creation process 500 outlined in FIGS. 5A-5B. As will be described below, the weather model is a machine learning model designed, developed, trained, and validated in the weather model creation process 500. The package model is a mathematical, transfer function based model designed, developed, optimized, and validated in a package model creation process 600. Finally, the decision model is a statistics-based model designed, developed, optimized, and validated in a decision model creation process 700.

Figure 2:
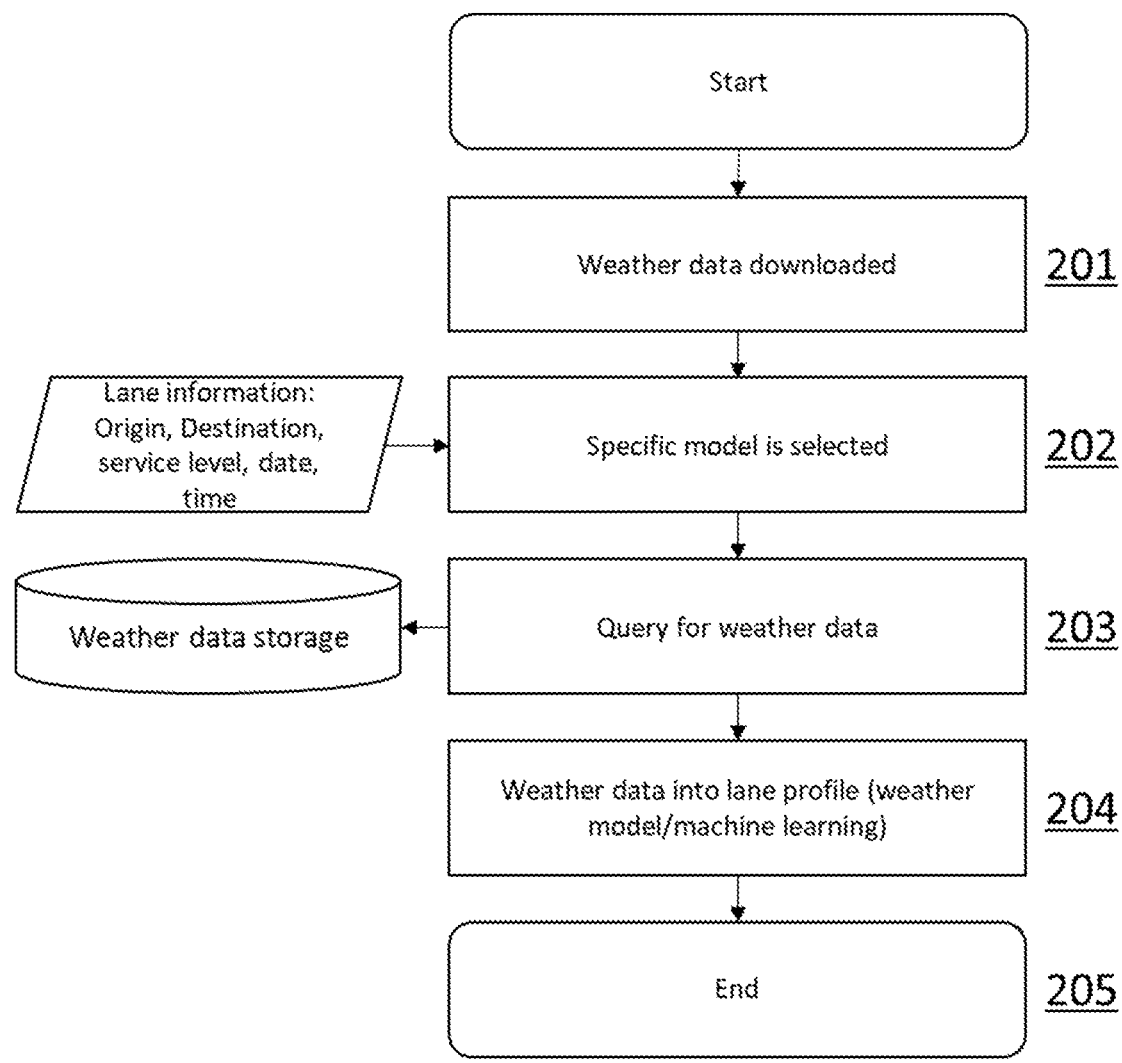
FIG. 2 is a flow chart that further details of processes performed in 102 of FIG. 1.

Weather Model (FIG. 2)

Models may be used to make decisions about optimal packaging for a given shipment. For example, if the user intends to ship a temperature controlled package from an origin "A" to a destination "B" by two day carrier, the user can look at the two day weather forecast for "A" and "B," and then choose a package that is optimal for the expected lane temperature during the shipment. This minimizes the overdesign that is in current use in the pharma industry. The weather model 102 can use past, current, or forecasted weather data to estimate the lane temperature during shipping.

With reference to FIG. 2, at 201, weather data is initially downloaded from a server. The weather data may be received in a gridded format or other, as understood in the art. Additional information is received, such as the origin, destination, service level, date, and time of the shipment. At 202, a specific model is selected based on the additional information. The details of the weather models are described below with reference to FIGS. 5A-5B. At 203, a query is then made to the weather data storage for information needed for the model in order to calculate the lane estimate. This data is stored in the weather data storage 103. The data contains all weather data from previous shipments and current weather data, such as temperature, cloud coverage, precipitation, surface air pressure, solar radiation, normal irradiance, horizontal radiation, pressure, wind direction, surface wind, surface dewpoint, wet bulb temperature, relative humidity, apparent temperature, wind speed, or many others. At 204, the data is then input to the weather model, which calculates a lane temperature estimate based on the data. This estimate is also stored in the weather data storage 103. The process ends at 205.

Figure 3:
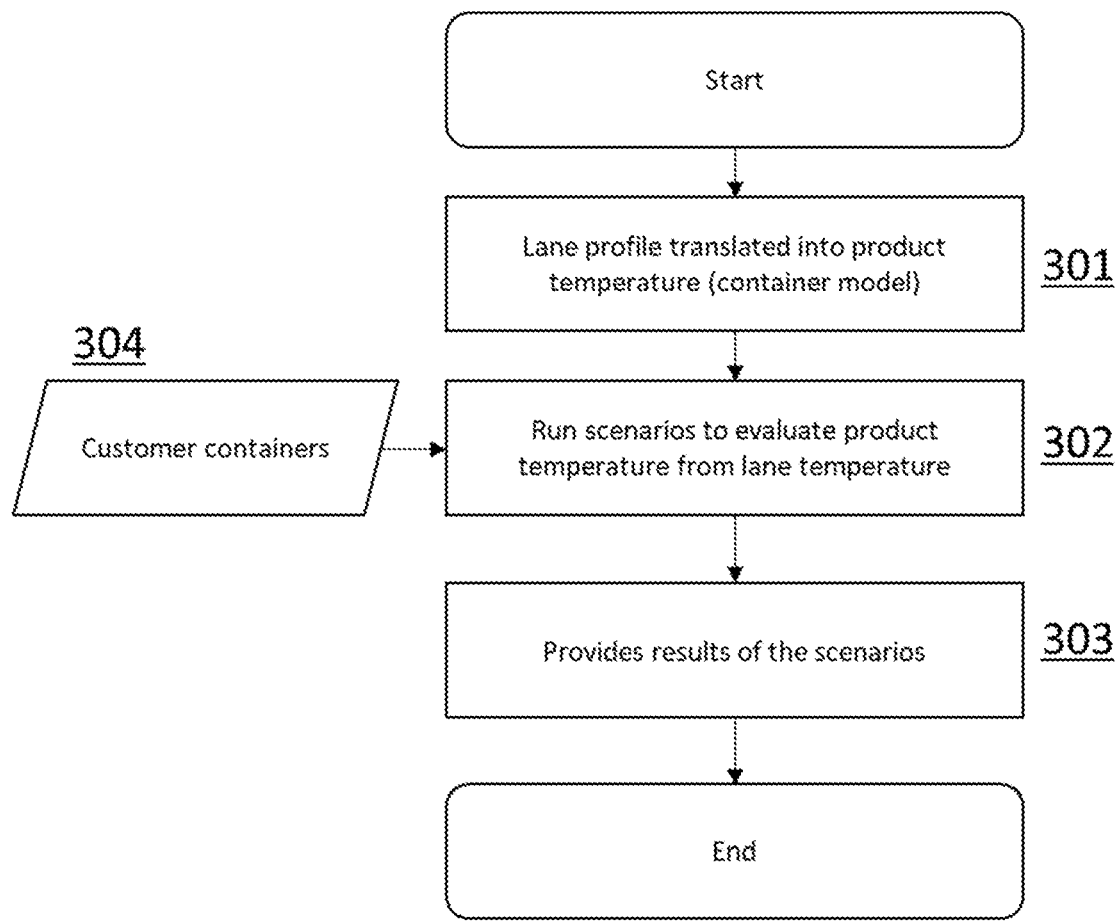
FIG. 3 is a flow chart that further details of processes performed in 104 of FIG. 1.

Package Model (FIG. 3)

With reference to FIG. 3, at 301, the lane temperature, which is output at 204 (see, FIG. 2) is provided to the package model. The package model is a first order plus dead time model designed, developed, trained, and validated in the package model creation process. The package model may use lane temperature estimates from past, present, or forecasted lane temperatures. At 302, the package model creates a scenario for the client. The scenario imports the lane temperature estimate (from 301) and selects among available client-specified containers (304). Each container model is loaded individually, which may use the structure in FIG. 7 or other if there are several different phase change materials (PCM) in the container. The models are a first order plus dead time (FOPDT) transfer function model, where the structure and equation coefficients vary by the container. The container model loads the coefficients for the equations the govern each stage of that container, as well as the heat needed for the PCM to change phase for the stage decider. The simulation for the container is run, and then the results are saved for evaluation in the decision model. After the scenario for a container is completed, the next container is loaded and simulated. Once the model simulates all of the client's containers the scenario is completed. At 303, the results from that scenario communicated to the client.

Figure 4:
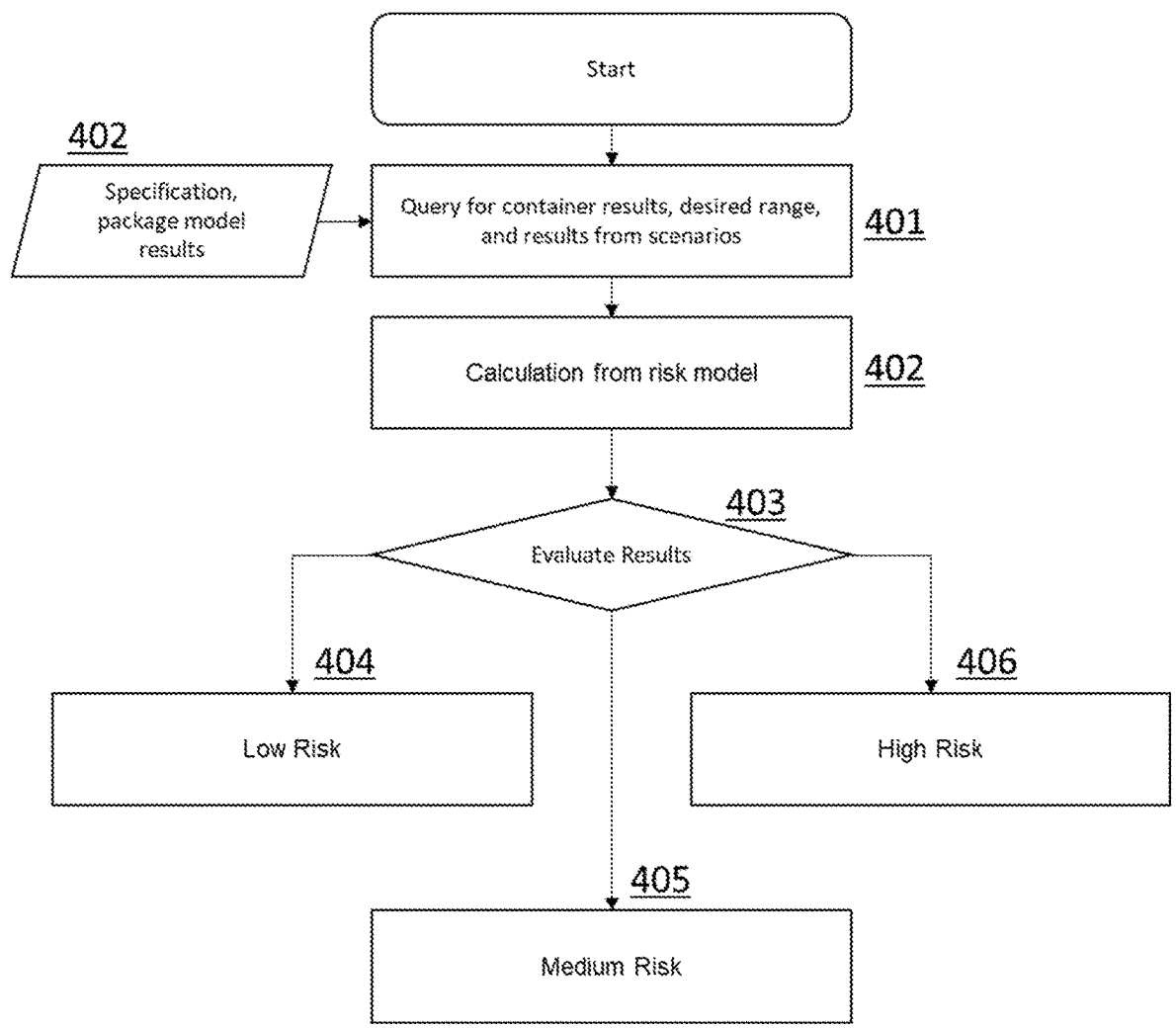
FIG. 4 is a flow chart that further details of processes performed in 106 of FIG. 1.

Decision Model (FIG. 4)

The output from the Package Model (104) is a time series data set that may be stored in Product Temperature Estimation Database (105). This time series data is associated with a particular package with a particular origin and destination and service level shipped at a particular time and date. The time and date can be in the future or in the past. With reference to FIG. 4, in the process 400, the output of the package model 104 and the client's specification for how risk-averse they want to be are received as inputs. At 401, these inputs are extracted by a query, and at 402, a statistical calculation is made to evaluate the risk associated with each of the scenarios calculated at 303 (see, FIG. 3). At 403, the results from step 402 are used in a client specific evaluation. In an example case, the scenario could classify each container for that shipment in a low, medium, or high-risk classification (404, 405, 406). In an example case, risk 404 could be an indication that unless there are extraordinary circumstances there is no risk to the product, risk 405 could indicate that the product may be fine but cannot be given the little/no risk evaluation based on the client's specification, and risk 406 could indicate that the product will likely be harmed under most circumstances.

As an example case, the time series temperature data is compared to the temperature specifications for the product. This allows the calculation of time out of temperature and maximum and minimum temperature for the product for that shipment.

Based on information from the product risk assessment, the maximum temperature, minimum temperature, and total time out of temperature is converted into a qualitative determination of the risk associated with that shipment for shipments in the future, and a qualitative determination of product quality for shipments that have already occurred.

For shipments, the formula may take the form:

$$t_{out} \rightarrow \text{Qualitative assessment} = \text{low risk}$$

$$t_{out} < t_{outspec} \text{ and } T_{max} < T_{maxspec} \text{ and } T_{min} > T_{minspec} \rightarrow \text{qualitative assessment} = \text{moderate risk}$$

$$t_{out} > t_{outspec} \text{ and } T_{max} > T_{maxspec} \text{ and } T_{min} > T_{minspec} \rightarrow \text{qualitative assessment} = \text{high risk}$$

where:
$t_{out}$ is the total time outside of temperature
$t_{outspec}$ is the specification for allowed total time out of temperature
$t_{max}$ is the maximum temperature is the data set
$T_{min}$ is the minimum temperature in the data set
$T_{maxspec}$ is the maximum allowable temperature in the data set
$T_{minspec}$ is the minimum allowable temperature in the data set The results of the decision model 106 are made available for access by the human machine interface (HMI) (107).

Figure 5A:
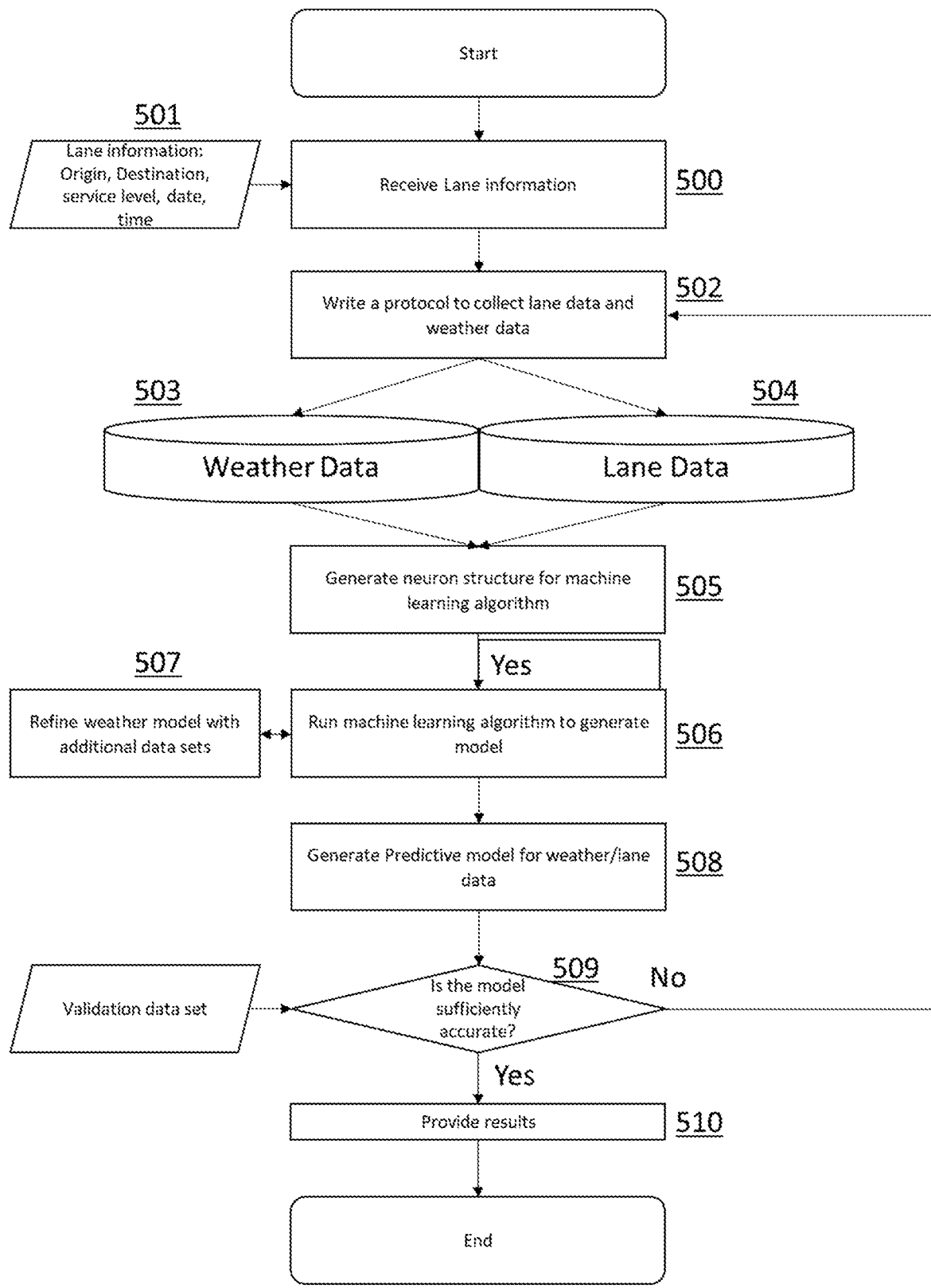
FIG. 5A is a flow chart that details the development of the process performed in 102 of FIG. 1.
Figure 5B:
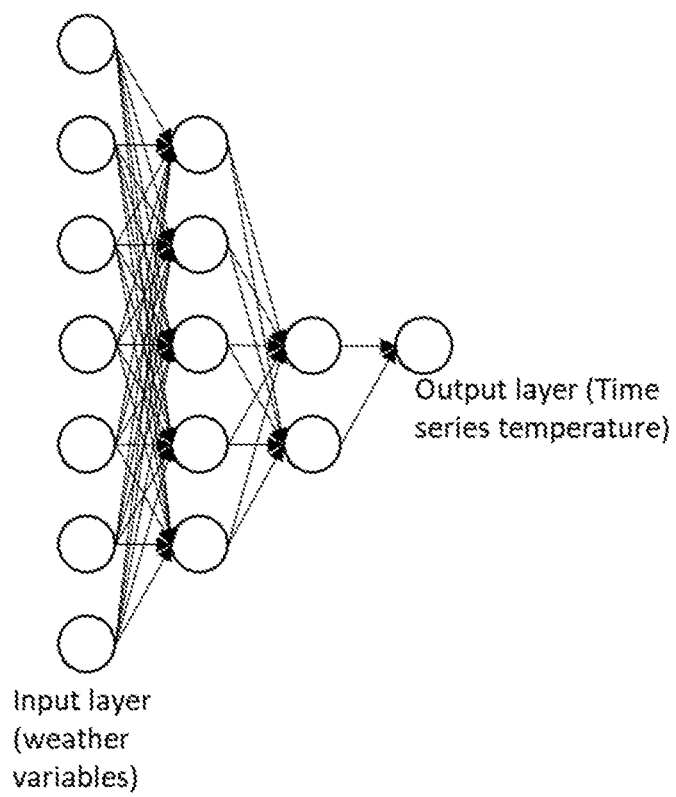
FIG. 5B is an example structure of the machine learning neurons in set layers.

Weather Model (FIGS. 5A-5B)

With reference to FIG. 5A, the development of the weather model begins at 500 by receiving data (e.g., lane information) from the client. By providing the various inputs 501, the parameters for development can be set. This information can include information such as the origin, destination, service level, date, and time of shipment. Once the information is gathered to define the parameters of the model, a protocol is written at 502 to gather data on the lane. This protocol may include steps so that both the weather data and the lane data are gathered for a shipment with corresponding dates and times. This data is sent to two storage locations, e.g., a weather database 503 and lane database 504.

At 505, a neural network machine learning algorithm structure is generated to create the weather model. The neural network utilizes loss functions and optimizers to identify the ideal structure and parameters. The loss function calculates the difference between the estimated temperature and the validation set of data. The optimizer is a function that uses derivatives of the multi-dimensional surfaces to determine if a variable needs to be more or less heavily weighed. The exact functions chosen for the machine learning algorithm will be determined as part of the optimization for a given data set, but in general the functions just determine how aggressively a solution is pursued and determine potential error.

The exact structure of the algorithm can be based on the algorithm's evaluation of the best structure, or it can be set by the developer. It may be comprised of several layers of neurons, each which evaluate the input from previous layers, and translate it into a single time series set of temperature data. It can also be in the form of a random forest machine learning algorithm, of which there is no set initial structure. FIG. 5B is an example structure of the machine learning neurons in set layers.

Many weather variables are available, but the model may only use the ones that are important for that lane. In an example case, the weather data may contain measurements of temperature, cloud coverage, precipitation, surface air pressure, solar radiation, normal irradiance, horizontal radiation, pressure, wind direction, surface wind, surface dewpoint, wet bulb temperature, relative humidity, apparent temperature, and wind speed. However, when the model is generated using the data it can make determinations such as, "Wind speed is very important and will weigh more heavily in the calculations, but the wind direction has almost no effect on the temperature and will be weighed less heavily (if at all)." The model is specific to an origin, destination, and service level, as each one has slightly different methods of transport and thus different reactions to each parameter. Some routes may be sent through a parcel network with several distribution centers, while others might ship via trucks straight to the destination.

Once the structure of the algorithm is set, data from the weather database 503 and the lane database 504 are provided as inputs as a validation set for the evaluation of how good the model fits the existing data. The training of the model, using the training data, allows the neural network to configure its internal parameters for flow of data information and values to and from the layers of neurons. After training, the model has a set of internal parameters for use.

At 506, data from the weather database 503 and the lane database 504 are fed into the weather model. Once completed, at 508, the algorithm then outputs the prediction. The algorithm performed at 506 can be refined at 507 by gathering additional sets of data, which may result in changes to the structure. If the weather model does not meet the validation parameters, the design is modified as needed (as described above) to meet the validation parameters and the process returns to 506 where the prediction is output at 508. Next, results are compared to data sets from the weather database 503 and the lane database 504. At 509, an evaluation is made to determine if the current model structure is sufficiently accurate. The weather model uses the validation data to compare the results and determine if the model is adequate based on validation criteria and allowable tolerance. If the weather model is not adequate, then the protocol to gather data (at 502) may be changed or expanded to collect more data. At 501, the results are then provided to the developer.

Figure 6:
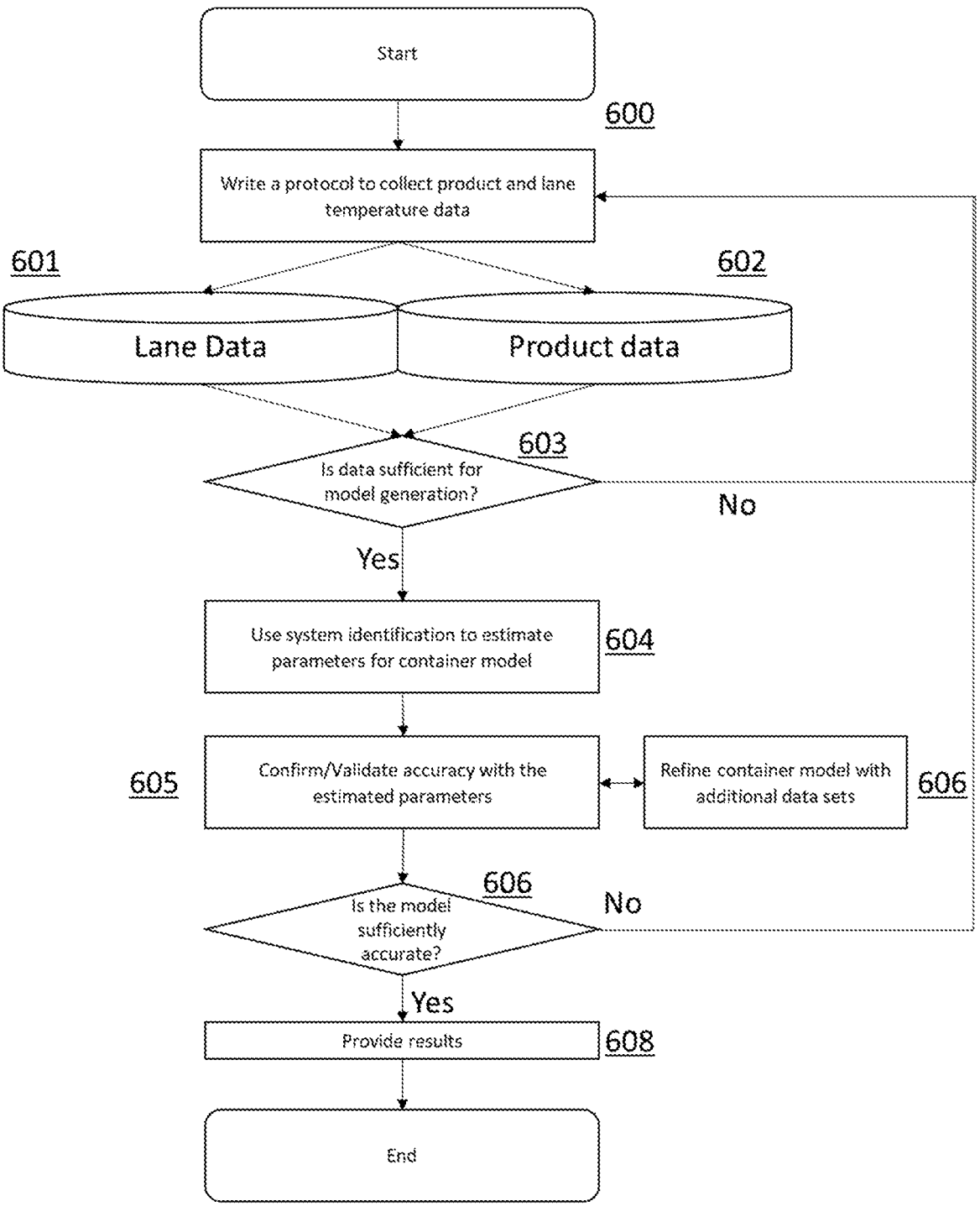
FIG. 6 is a flow chart that details the development of the process performed in 104 of FIG. 1.

Package Model (FIG. 6)

With reference to FIG. 6, the development of the package model begins at 600 by writing a protocol to gather data sets. The protocol will gather product temperature data and lane temperature data contemporaneously. This data is sent to a lane temperature storage 601 and product temperature storage 602. At 603, a determination is made if the gathered data is sufficient for an accurate model.

In an example case, this determination can be made based on a statistical analysis of the available data, in addition to any additional data that is gathered. The model may consider the operating error of a container, the client's acceptable risk levels, and the actual temperature of the shipments that are being used for the validation sets. If the model data is considered sufficient, the data is used for the package model generation. The structure of the package model may vary slightly between different types of containers, but the parameters of the equations to make the model can be estimated at 604 using a system identification software. When the parameters are set, the additional data sets are used at 605 as input for the model to evaluate its accuracy. At 606, a determination is made if the model is sufficiently accurate. The model is considered accurate enough if the results from the model are within a client's specified tolerance. For instance, a client may state their allowable tolerance is ±2° C. at all times from the actual temperature, or it may be that on average the error over the whole shipment is ±0.5° C. The client will dictate the criteria, and the model generation will account for it when determining if it is sufficiently accurate. If the model is not considered sufficiently accurate, and the original data collection protocol will be changed or expanded to collect more data. If the model is considered sufficiently accurate, the results are provided to the developer at 608.

Figure 7:
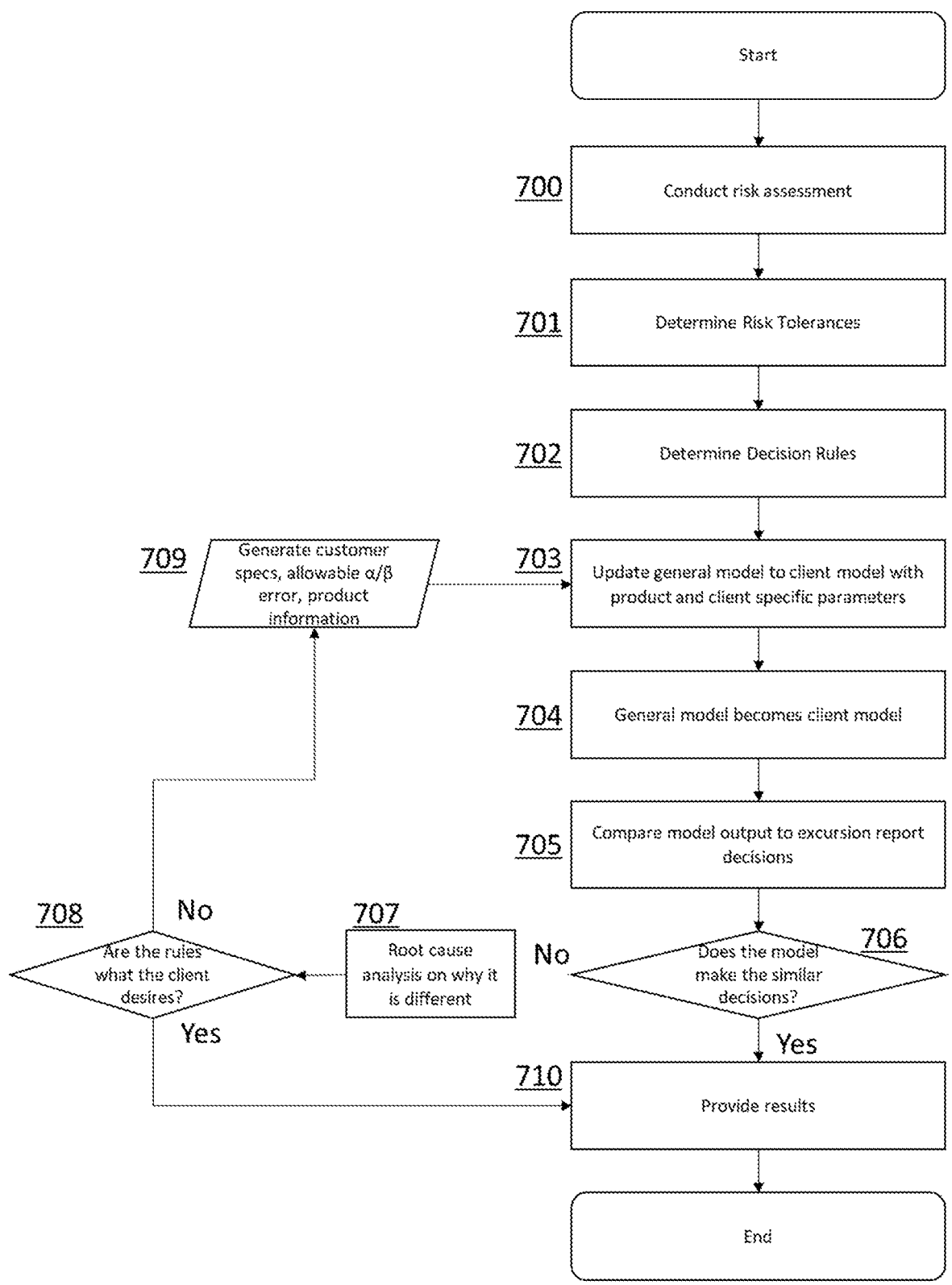
FIG. 7 is a flow chart that describes an example pseudo-geometry and stage decider used in the development of the process performed in 104 of FIG. 1.

Decision Model (FIG. 7)

The decision model in accordance with an acceptable risk for the shipments. The development begins with determining a risk assessment (700). This risk assessment is usually product specific, but can be generalized for all products that can be shipped. The risk assessment gathers data such as the high and low temperature allowances and durations allowed at temperatures outside that range. After conducting the risk assessment, the tolerances are determined for how to evaluate the model (701). These tolerances can be based on averages, moving averages, maximum allowable difference from actual data, or other criteria. Risk is calculated based on several different factors that give a statistical estimate of the results of the simulations. In an example case, the variables that may be considered for evaluation include the confidence intervals of the weather forecast variables, the confidence interval of the estimated lane temperature, and the confidence interval of the estimated container temperature.

These criteria can be used alone or in combined based on, e.g., a client's needs. The tolerances and product risks are combined to determine the decision rules (702). In an example case, the decision rules can be, "the product must stay between 2° C. and 8° C. for the entire duration, must be within 1° C. accuracy for every data point. If it is outside that temperature range it cannot go above 25° C. ever, and can tolerate 10 hours at temperatures between 8° C. and 25° C." The general form of the decision model is updated with the client specific criteria, and the ways to evaluate and display risk are determined (703). The client may decide they want to display the risk results in terms of low risk, medium risk, and high risk. In example cases, these risk levels could be presented to a client in the form of a risk percentage, a red/yellow/green evaluation, or as a simple yes/no response.

Each risk bracket is then determined using the combination of criteria identified above (704). After the client model is generated it is compared to decisions that the client has made in the past for excursions and evaluations (705). During their lifetime, most temperature sensitive products have shipments where an excursion has occurred. When these occur, from the temperature data, a decision may be made on the impact on the product quality. These generate reports which can be used as the validation sets (706).

If the model yields the same decisions as the client, it is considered a validated model and can be used in the production environment (710). If it results different decisions than expected from the client, a root cause analysis may be conducted (707). The root cause analysis will determine if the decision rules are faulty, if the client is not following their evaluation tools, or if there is a missing parameter in the decision model. If the decision rules match the client decision model, but the client has made different decisions in the past, the model is still considered validated and the client will change their evaluation tools to conform with the model (708).

Figure 8:
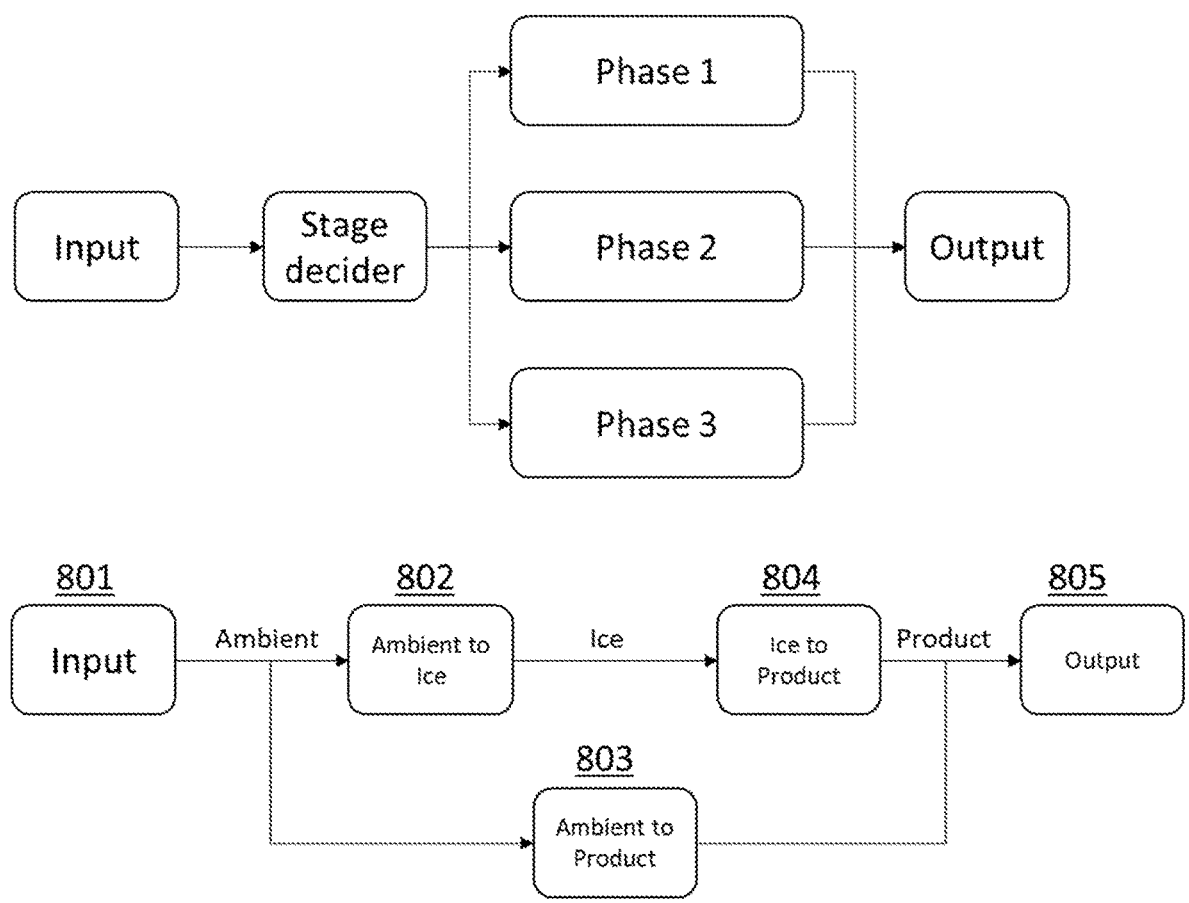
FIG. 8 is a flow chart that details the development of the process performed in 106 of FIG. 1.

Pseudo Geometry (FIG. 8)

Using conventional geometry, modeling a thermal package's heat transfer is a non-trivial four dimensional partial differential equation. The present disclosure provides a solution by first creating a pseudo-geometry that simplifies the problem. The pseudo geometry assumes there are three heat transfer processes in the thermal package: product to PCM, ambient to product, and ambient to PCM. For each of the three heat transfer processes, the solution of the partial differential equation is posited to be a first order plus dead time (FOPDT) model. In a FOPDT model, there are three coefficients: the gain, time constant, and dead time. These change as the PCM in the thermal package change phase. As a result, the heat transfer processes are modeled by simultaneously solving the three FOPDT models and adjusting the constants for subcooled PCMs, PCMs that are changing phase, and PCMs that have fully changed phase. In the model structure there is a conditional switch (stage decider) which determines which stage the package model is in. This switch evaluates the heat flowing in and out of the PCM to determine if they have changed phase or not. This pseudo geometry can work with multiple phase change materials with different phase change temperatures.

FIG. 8 describes an example case of the pseudo geometry that is used in development of the packaging model 104. At 801, the package model 104 is provided product temperature and lane temperature data sets from real shipments. The parameters of the equations involved in the pseudo geometry are attuned to the container, the loading, and the service level of the shipment. In addition, in the example case there are typically three stages to any particular shipment which is governed by the state of the PCM. There is the subcooled stage (stage 1), where the PCM has not begun to change phase. There is the melting stage (stage 2), where the PCM is changing phase. There is the melted stage (stage 3), where the PCM is past its phase change point. The actual model evaluates the equations based on a separate calculation that decides which stage the system is in.

The model parameters are optimized for each individual stage, as each stage has slightly different heat transfer characteristics. If the model does not perform well, additional data is collected to help characterize the system.

In a different example case, the model can analyze a system that does not contain PCM and instead uses active cooling. A refrigerated system can still be characterized by the heat transfer pathways, but with different parameters. The product can be in a refrigerated trailer, directly exposed to the air. In this circumstance the product temperature can still be evaluated, it will just be very similar or the same as the lane temperature.

The development of the package model not only identifies the temperature of the product in the container, but also identifies the operational variability of the container. This variability is something that is inherent in almost every process, and is the result of minor manufacturing differences, minor differences in human operation, or other seemingly insignificant factors. This variability for the container is used later in the decision model The package model 104 is built using a pseudo geometry to evaluate the temperature of the product. The pseudo geometry analyses the interactions between components instead of the components themselves to determine the product temperature. In an example case, there can be three sources or sinks for heat transfer in a typical container; the phase change material (PCM), the outside air temperature (ambient), and the product. In a typical simulation these components are all placed in the specific spots where they would be in reality and given properties of the components such as their thermal conductivity, density, overall mass, and other properties. In the pseudo geometry the placement and individual properties are largely ignored, and the focus is on the interactions of the components, which can be described by a simple first order plus dead time (FOPDT) function:

$$T(s) = \frac{Ke^\theta}{\tau s + 1}$$

T is the temperature of the product at a particular time (s). K is the gain of the system, which in this case is always 1 and is ignored. $\Theta$ is the dead time, which is the delay before the temperature is affected by the heat transfer. $\tau$ is the time constant, which is a number that describes how quickly the temperature changes after it is exposed to something that is trying to change it. This equation applies to each of the individual heat transfer pathways, and each pathway has its own parameters. In the example case, there would be three heat transfer pathways:

Ambient↔Product (803);
Ambient↔PCM (802); and
PCM↔Product (804).

The pseudo geometry contains a stage deciding switch, which determines the state of the PCM in the system. In an example case there are three stages to a container. Stage 1 is a consistent time delay for most containers, often referred to as the "equilibration time" of the container. This time is where materials are getting to the temperature at which they will be for most of the shipment. When the stage decider is evaluating at the beginning of a shipment, it is often set to just use the time delay characteristic for a container. Stage 2 and Stage 3 of the container are evaluations of the system before and after the PCM changes phase. The PCM in a container reacts to heat the same way that any ice does; if it is exposed to enough heat it will melt, but if it is cooled down after that, it will refreeze. The stage decider monitors the heat into the system and determines when the PCM changes phase, but it also evaluates if the heat transfer out of the system is enough to change its phase back. This is a simplified case as there may be multiple PCMs in a container with very different properties, and there could potentially be more stages based on that circumstance.

Stage 2 and stage 3 of the decider is evaluated by calculating heat into or out of the system. The example case in FIG. 8 contains a single PCM, but it is not uncommon for there to be multiple different PCMs in a single container. This stage decider considers the heat flowing into or out of the system over time and the thermodynamic properties of the PCM. The equation that describes this calculation is below:

$$\Delta H_{system}(t) = \int_{t1}^{t2} T(t) - T_{phase\ change}$$

where:
$\Delta H(t)$ is the heat change in the system
t is time, with $t_2$ being the final time and $t_1$ being the start time
T(t) is the ambient temperature at a given time
$T_{phase\ change}$ is the temperature at which a PCM changes phase The phase change temperature is constant because all energy going into or out of the system contributes solely to the energy needed to change phase at that temperature, and not to changing the temperature of the PCM.

The PCMs in a container will have consistent properties across every shipment, and it is easily determined where they have changed phase by evaluating the second derivative of the temperature data from previous shipments. When the inflection of the curve changes, that is a point where all the PCM has changed phase. This time point is then used in the equation to calculate the total heat that flowed into the system before it finished changing phase. The total heat that has flowed into or out of the system is then known and is set as a consistent property for that container. When a container is shipped in reality this same value is used. The total heat into or out of the system is calculated at every step, and when it exceeds the predetermined value, the package model changes which equations are used to evaluate temperature. Once the system is well characterized, the model is implemented in the production environment.

Interpolation of Simple System Coefficients to Determine Unknown Complicated Behavior In an example case, any one particular packaging system heat transfer pathway may be governed by a simple equation with only two variable coefficients.

$$T(s) = \frac{e^\theta}{\tau s + 1}$$

When the entire packaging system is combined for evaluation the resulting equation can potentially have more than a dozen coefficients. However, the overall complicated system is still composed of those simple systems. The extra coefficients are in actuality different combinations of the coefficients from the simple systems. The combined equations can be easily represented by the form:

$$T_{product}(s) = (T_{PCM\ to\ Product}(s))(T_{Ambient\ to\ PCM}(s)) + (T_{Ambient\ to\ Product}(s))$$

The above may be expanded to capture all variables and is represented by the form:

$$T_{product}(s) = \left( \frac{e^{\theta_1} e^{\theta_2}(\tau_3 s + 1) + e^{\theta_3}(\tau_1 s + 1)(\tau_2 s + 1)}{(\tau_1 s + 1)(\tau_2 s + 1)(\tau_3 s + 1)} \right)$$

where a subscript of 1 is for the PCM to product pathway, a subscript of 2 is for the ambient to PCM pathway, and a subscript of 3 is for the ambient to product pathway.

The coefficients used in the package model use this property to determine the behavior of packages with loadings that have not been tested. In an example case, a package model may be characterized by using data from shipments of the minimum and maximum loading. These examples would have different coefficients for the $\tau$ and $\theta$ variables. If the model was queried for the behavior of a package loaded with product between these two amounts, there may not be data to directly characterize it. The model can interpolate the coefficients ($\tau$ and $\theta$) from the simple systems in minimum and maximum loading equations to determine the behavior for any point in between the validated data sets.

Example Cases

As an example case on how the overall process would work, the system would begin with a client providing data on their available containers. When the client is ready to make a shipment, they can query the system to make an evaluation. The client specifies origin and destination, and the system generates a set of scenarios from day zero to sometime in the future (fourteen days) using a preset of packages (heavily insulated, moderately insulated, and lightly insulated) and shipping service levels (next day, two day, and ground). The system will use weather data to generate an estimate of the lane temperature for each shipment scenario. Then, the system will evaluate each of the client's containers against the lane temperatures. This will provide an estimated product temperature, along with a statistical analysis on how accurate the estimate is for each scenario (14×3×3 or 126 in this example). This is finally translated into a risk chart, where the client may be given a chart with red (high risk), yellow (medium risk), and green (low/no risk) rankings. The process from start to end will only take a few minutes. Typically, an overdesigned solution would be used, but the client may see that another design that is much cheaper has little/no risk to the product.

In an example case, a shipment in January is scheduled that needs to maintain temperatures between 35° F. and 46° F. The client has a "winter container" used during this time of year, and is a 24-hour duration container which is designed to prevent the product from freezing during colder months. This container has extra PCM in it to prevent the product from freezing.

The client queries the system to run a set of scenarios for the next week with the available containers, service levels, on each day of the week. That set of scenarios determines that it will be uncharacteristically cold (<−20° F.) during days 1 and 2 of the week, and every container option shows a high-level risk of the product getting too cold. It also determines on day 3 of the week that the temperatures are about average for that time of year (~30° F.), and the winter containers have a medium level risk of the product getting too cold. On day 4 of the week, the model determines it will be uncharacteristically warm with forecasted temperatures above 60° F. at both the origin and destination. The system determines that there is a high level risk of the product getting too warm in the winter container.

However, the "summer container" used by this client has less PCM, and has a low level risk of the product getting too warm or cold in this particular scenario. It also shows that because there is a mild outside temperature (60° F.) and not the extreme temperatures the box was designed for (>90° F.), the summer box can be shipped via 2-day shipping instead of overnight shipping with no added risk. The client can use the summer container in January, with lower cost due to reduced weight, less materials, and cheaper service level, while simultaneously reducing the risk that the product will go out of temperature.

In a different example case, the client may have a container that did not include a temperature monitor when it should have, but they need to know if the product's temperature was maintained. Under normal circumstances, this product would need to be discarded or used "at risk" with a patient because there is no way to evaluate impact to product quality. The client knows the container, origin, destination, and approximately when it was shipped. The evaluation and risk system can be queried to give an estimation of the product temperature during the shipment to determine if it maintained temperature. If it did not maintain temperature, there is still a good estimation of how long it spent at different temperatures, which allows the manufacturer to determine the impact of the excursion on the product quality. The product potentially can be saved and given to a patient with no risk to safety, and the manufacturer is not required to pay for replacing the product.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, USB drives, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for modeling a temperature in a thermal package in a lane of commerce, comprising:
   receiving weather data;
   selecting a weather model in accordance with an origin of a shipment, a destination of the shipment, a service level, and a date and a time of the shipment, the weather model being determined by a neural network machine learning algorithm that is trained using the weather data and lane data, wherein the neural network machine learning algorithm is determined using loss functions that calculate a difference between an estimated temperature and a validation set of data, and optimizers that use derivatives of multi-dimensional surfaces to determine variables weights, the loss functions and optimizers identifying an ideal structure of the neural network machine learning algorithm;
   determining an estimated lane temperature for the shipment using a selected weather model, wherein the estimated lane temperature is an estimate of a temperature it actually experienced by the thermal package between the origin and the destination;
   determining a product temperature using a package model in accordance with the estimated lane temperature;
   determining a packaging to be used for the shipment from the product temperature; and
   displaying a determined packaging in a user interface.

2. The method of claim 1, wherein the weather model includes weather data from previous shipments and current weather data.

3. The method of claim 2, wherein the weather model includes at least one of temperature, cloud coverage, precipitation, surface air pressure, solar radiation, normal irradiance, horizontal radiation, pressure, wind direction, surface wind, surface dewpoint, wet bulb temperature, relative humidity, apparent temperature, and wind speed.

4. The method of claim 1, further comprising determining the estimated lane temperature for the shipment using a machine learning algorithm.

5. The method of claim 1, further comprising determining the product temperature using a first order plus dead time model.

6. The method of claim 5, wherein the lane temperature estimates include at least one of past, present, and forecasted lane temperatures.

7. The method of claim 5, further comprising using the package model to create a shipment scenario that imports the lane temperature estimate and selects from predetermined containers.

8. The method of claim 7, further comprising:
   running shipment scenarios for a plurality of containers; and
   determining the packaging to be used for the shipment using the results of the shipment scenarios.

9. The method of claim 8, further comprising:
   generating time series data from the package model;
   associating the time series data with a particular package, a particular origin a particular destination, and a service level shipped at a particular time and date; and
   determining a risk associated with each of the shipment scenarios.

10. The method of claim 9, further comprising:
    classifying the risk associated with each scenario; and
    providing an indication of the risk in a user interface, wherein the risk indicates at least a possibility that the product will be harmed under a determined product temperature.

11. The method of claim 9, further comprising converting a maximum temperature, a minimum temperature, and a total time out of temperature into a qualitative determination of the risk associated with the shipment.

12. The method of claim 1, determining the weather model further comprising receiving the origin, the destination, a service level, the date and the time of shipment.

13. The method of claim 12, wherein the weather data comprises at least one of measurements of temperature, cloud coverage, precipitation, surface air pressure, solar radiation, normal irradiance, horizontal radiation, pressure, wind direction, surface wind, surface dewpoint, wet bulb temperature, relative humidity, apparent temperature, and wind speed, and wherein the weather data applies weights to each of the measurements.

14. The method of claim 1, determining a package model further comprising:
    ascertaining product temperature data and lane temperature data;
    determining if the package model is within a specified temperature tolerance for the shipment.

15. The method of claim 14, wherein the package model accounts for an operating error of a container, an acceptable risk level, and an actual temperature of the shipment.

16. The method of claim 1, determining a packaging to be used for the shipment from the product temperature, further comprising:
    determining an allowable risk for the shipment, wherein the risk accounts for high and low temperatures and durations allowed at temperatures outside that range for a product.

17. The method of claim 16, further comprising displaying risk levels in a user interface as one of a risk percentage, a color-coded evaluation, or as a yes/no indication.

\* \* \* \* \*